July 28, 1959  R. P. SOURGENS ET AL  2,897,258
ELECTRONIC TELEPRINTER
Filed Aug. 1, 1957  8 Sheets-Sheet 3
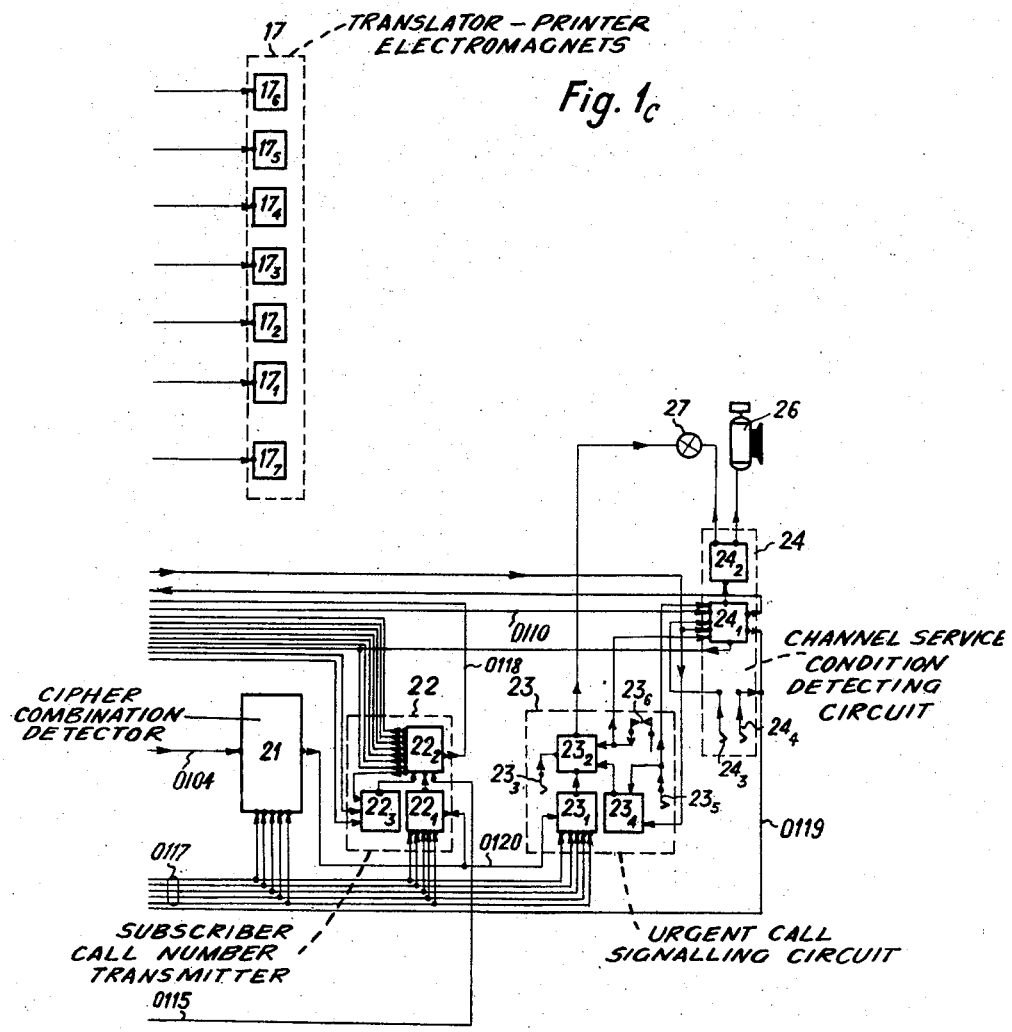
ROGER P. SOURGENS
RAYMONDA. CHOLLET
INVENTORS
By  A. A. SAFFITZ
ATTORNEY

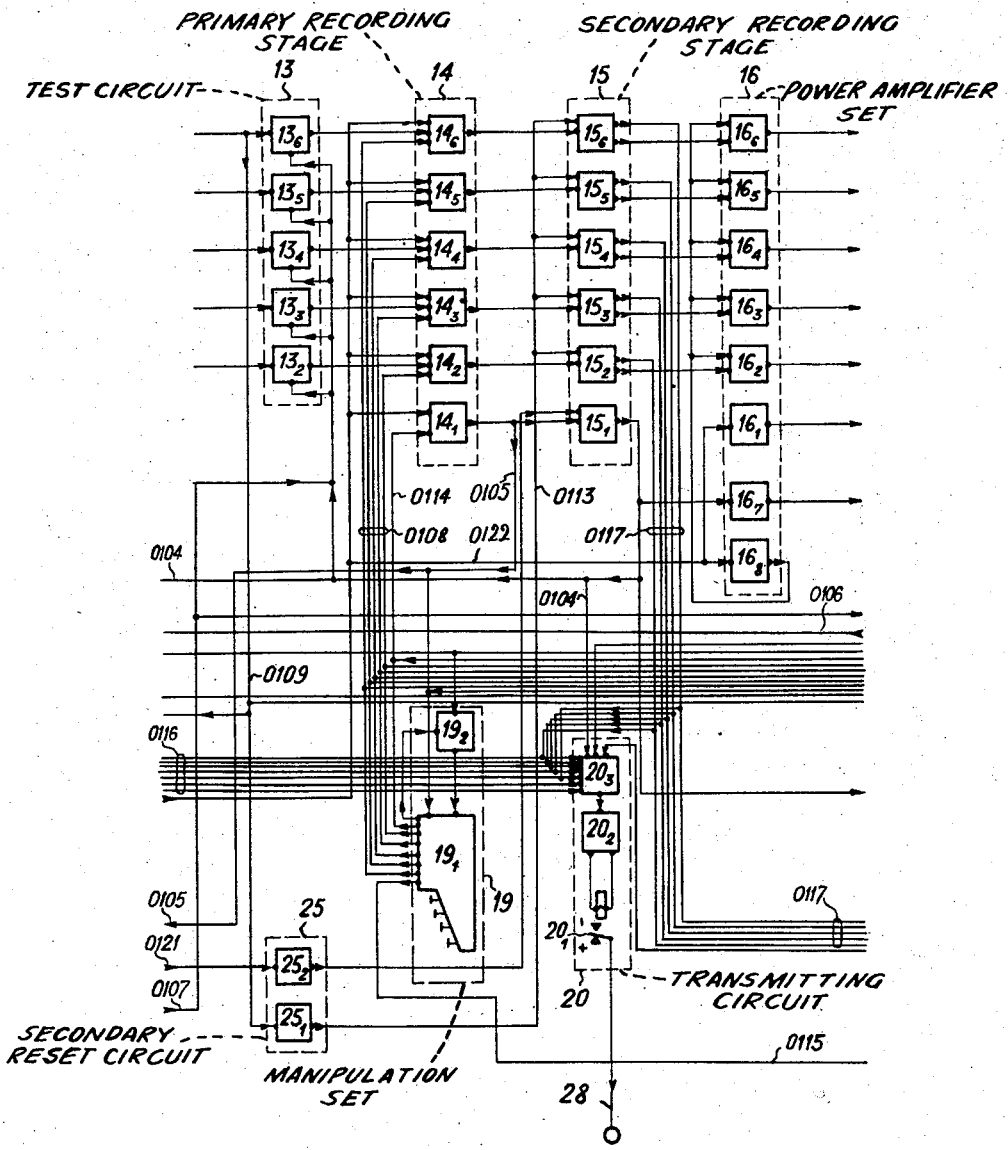

ROGER P. SOURGENS
RAYMOND A. CHOLLET
INVENTORS

By A.A. SAEFITZ
ATTORNEY

July 28, 1959  R. P. SOURGENS ET AL  2,897,258
ELECTRONIC TELEPRINTER
Filed Aug. 1, 1957  8 Sheets-Sheet 5

ROGER P. SOURGENS
RAYMOND A. CHOLLET
INVENTORS
By A.A. SAFFITZ
ATTORNEY

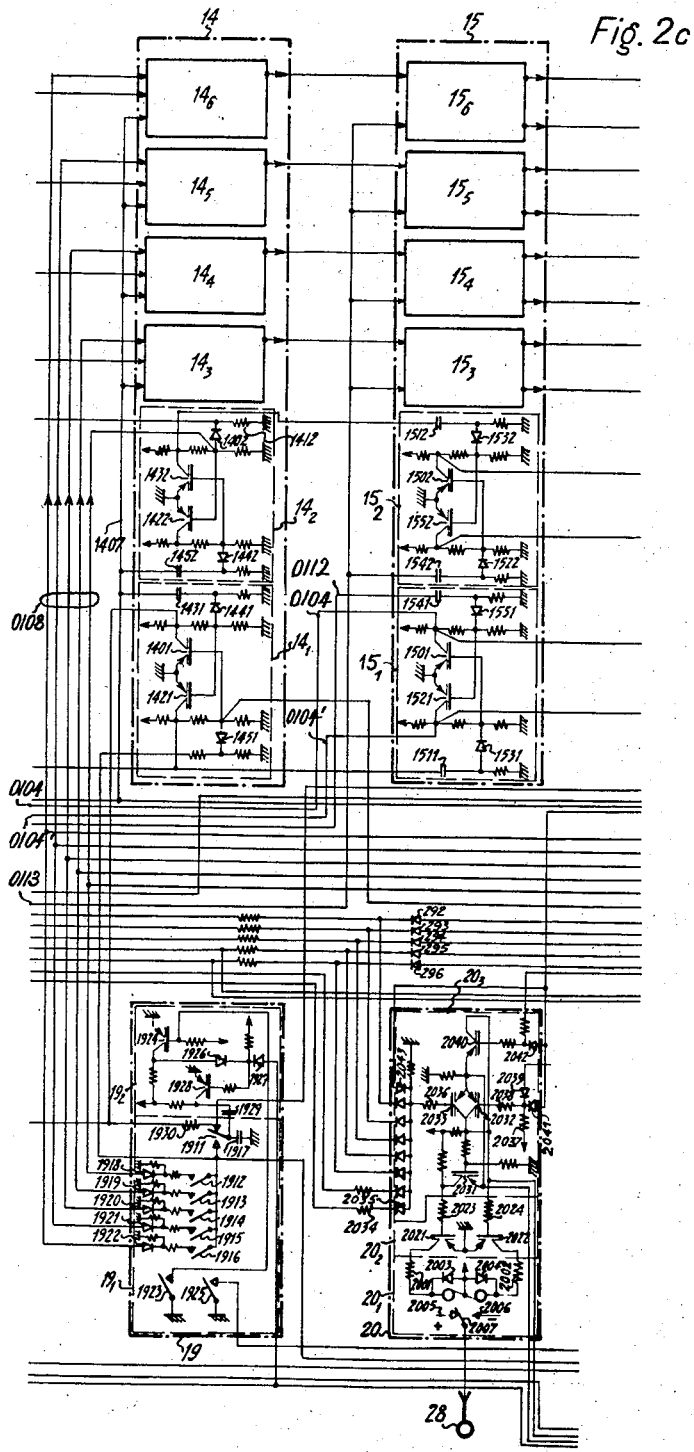

ROGER P. SOURGENS
RAYMOND A. CHOLLET
INVENTORS

By A.A. SAFFITZ
ATTORNEY

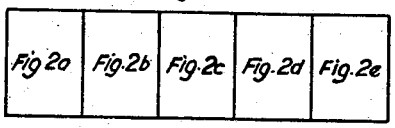
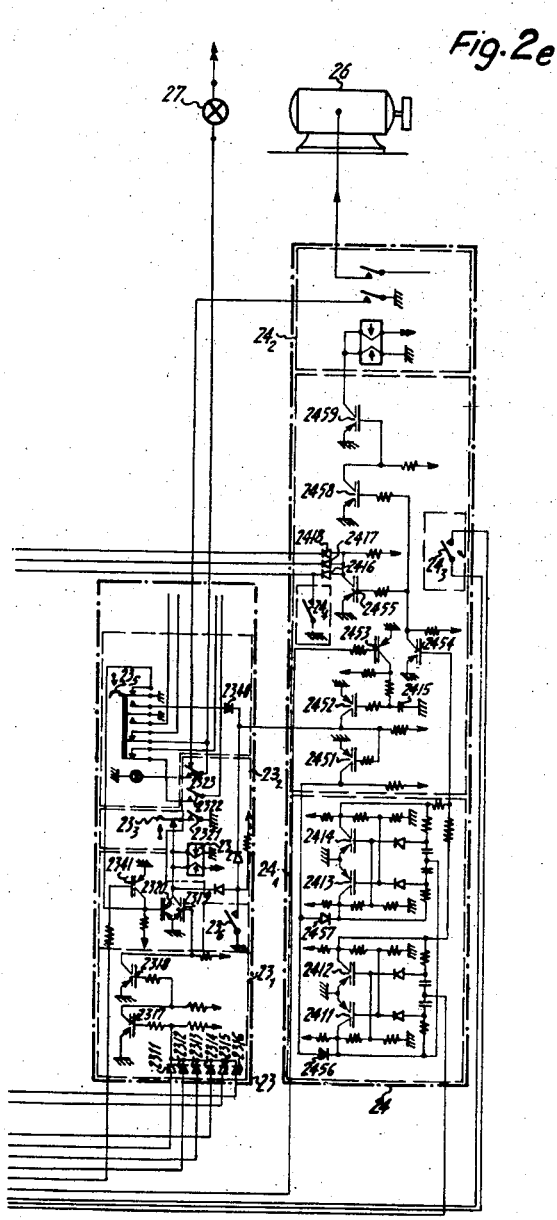
ROGER P. SOURGENS
RAYMOND A. CHOLLET
INVENTORS
By A A SAFFITZ
ATTORNEY

United States Patent Office 2,897,258
Patented July 28, 1959

2,897,258

ELECTRONIC TELEPRINTER

Roger P. Sourgens, Bellevue, and Raymond A. Chollet, Boissy-St-Leger, France

Application August 1, 1957, Serial No. 675,730

Claims priority, application France August 2, 1956

4 Claims. (Cl. 178—2)

The present invention relates to electronic teleprinters.

In telegraphic systems of the so-called arhythmic type, each character to be transmitted is generally represented by applying successively to a telegraphic line a group of elementary signals having the same duration. More precisely, each character to be transmitted is materialized by first sending a start element intended to actuate the receiver and to establish a time origin, then by sending 5 code elements whose polarities are specific of the character to be transmitted and which have been previously recorded on storage devices and finally by sending a stop element. The duration of this last element may well not exceed that of the other elements. It can also, generally, occupy the whole time interval which precedes the sending of the start element of the next character. The sending of a character is initiated either by depressing a keyboard key, the said keyboard being an integral or associated part of the transmitting set, or by some coding device (call signal transmitter, punch tape reader, etc.).

In the case of the keyboard, each key is associated to a coding device which determines the polarities of the five code elements; these 5 elements constitute the telegraphic modulation representative of the character corresponding to the said key, which is inserted between the start and stop element.

When receiving, each start element preceding the code elements generally initiates first an analyzing device intended to test each code element polarity. This test takes place as close as possible to the center of each received code element. The shorter the duration of this test, the greater the margin tolerance of the receiving set. The whole group of polarities is then materialized, either electrically or mechanically, then this materialization is used as data to operate a printing mechanism intended to transcribe on a paper sheet or tape the characters corresponding to the received modulation.

In the more general case of "push-to-talk" relay operation, i.e., when the same teleprinting machine is used now to transmit and now to receive, the printing mechanism is used to print both the transmitted (local control) and the received characters. The set summarily described above is generally completed by mechanical or electro-mechanical devices intended to fulfill local function amongst which it may be cited:

(a) A "transmission-reception" switch which automatically connects the line with either the transmitting part or as the case may be the receiving part of the teleprinter. At rest, this switch is normally set to "reception." It is automatically brought to "transmission" and held there as long as is necessary. Where operating in duplex, with the so-called "harmonic" or carrier current telegraphic systems, the "transmission-reception" switch controls the connection of the printing elements with either the transmitting part (control) or the receiving part of the teleprinter.

(b) Locking out the unused keys during operation: As soon as one key is depressed, the other keys are locked on the rest position so that there can be no possible alteration of the transmitted combination.

(c) A call device: Each time a teleprinter receives the double combination "Figure J" (i.e. the character "Figs." followed by the character "J") which is the call combination, the latter actuates a call circuit (e.g. pilot light or bell). This call circuit can only resume its initial state of rest after intervention of the operator.

(d) An automatic call signal transmitter: Each time a teleprinter receives the double combination "Figure D" it must automatically transmit its call signal so that the calling subscriber can check the required subscriber's identity, even in the absence of the operator. This call signal transmission can also be initiated locally by pushing a button or a key intended to that effect and generally labeled "Here is."

(e) A detection device of the channel service condition: Outside of the above-mentioned functions, the teleprinter is generally linked to an operating box whose elements complete the teleprinter proper and enable the transmitting, receiving and retransmitting of the switching signals, mostly the signals corresponding to the service condition "free" or the service condition "busy" of the telegraphic channel where the communication in question is taking place.

(f) A repetition device: It may sometimes be advantageous (during the maintenance operations, for instance) to require from the teleprinter, in automatic and continuous transmission, that the same character be repeated. Generally, the operator depresses successively the key corresponding to the desired character and then a button labeled "repetition" which initiates the repeated transmission of said character. This transmission lasts as long as the "repetition" button is depressed.

(g) A blocking device: This device is intended to prevent, at will, the starting of the teleprinter in some special cases. Control of this device can be manual (for instance if maintaining the teleprinter) or automatic because the teleprinter is not capable of receiving (for instance when the teleprinter is being supplied with paper).

(h) A local test device: This device is intended to permit operating the keyboard, checking its control without carrying out any transmission, while being kept informed of an outside call.

(i) A bicolor control device: This device is intended to determine the printing color as a function of the origin of the characters to be printed: for example, black print for the received characters, red print for the transmitted characters.

Such machines are presently applied, in their mechanical version, to a large number of telegraphic communications. Certain functions such as movement regulation, time distribution, testing of the polarity of the code elements, identification of the characters, etc., require, at the usual traffic speed, and all the more so, at higher speeds, the application of various precision mechanisms, fragile, costly, bulky and often noisy. Increasing of the telegraphic speed is limited by the mechanical element inertia. Friction brings about a relatively rapid wear of the elements and limits the lifetime of such machines to a reduced value.

Electronic machines have also been propounded (cf. British Patent No. 733,071, filed March 6, 1952, and French Patent No. 945,227, filed April 16, 1947) capable of storing the code elements constituting a character to be transmitetd in some storage means and sending them in line and sequentially thanks to a time base. These same machines can also store the code elements constituting a character to be received in some storage means and test them by pulses produced by the time base and occurring at the centers of the time intervals occupied by these code elements.

However, these machines are not quite satisfactory. To render the transmission speed independant of the keyboard speed, the characters to be transmitted must be stored successively in two cascade connected storage stages. On the other hand, the time base, if it is to be used for both transmitting and receiving, must have a different cycle in both cases. Whereas the transmitting cycle is generally 150 milliseconds (six times 20 milliseconds for the start and the 5 code elements plus 30 milliseconds for the stop element) the receiving cycle must be 130 milliseconds to take into consideration an eventual distortion of the received character as will be explained hereinafter. Finally, it is highly desirable that the local function devices be equally electronic circuits interconnected both with the time base and the transmitting and receiving storage means. The present invention consists in obtaining a transistorized electronic set-up of teleprinting machines such that it can fulfill all their main and subsidiary functions (except for the printing function proper).

The electronic teleprinter of the invention comprises:

(A) A time base, usable both for transmission or reception, whose cycle is automatically adjusted to these two cases, i.e. when receiving is equal to 6.5 elementary time intervals and when transmitting to 7.5 elementary time intervals. If the elementary time interval is assumed to be twenty milliseconds long, this gives respectively a cycle duration of 130 and 150 milliseconds when receiving and transmitting at 50 bauds. It has been seen that the transmitting cycle should have a 150 milliseconds' duration so as to give the stop element a 1.5 telegraphic unit interval duration or 30 milliseconds. The receiving cycle must have a 130 milliseconds' duration for the following reasons:

The test must occur at the centers of the code elements, that is to say at 30, 50, 70, 90 and 110 milliseconds. If, however the fifth code element has a negative marking polarity and since the stop element has generally a positive spacing polarity, the step occurring between these two elements at the time 120 milliseconds could be construed by the time base as being a starting signal if the cycle were to halt at 110 milliseconds.

Furthermore since the stop element can be subjected to a distortion of almost 50%, the above mentioned step can take place, not at 120 milliseconds any more, but at almost 130 milliseconds. The time base supplies:

(A-1) Correcting pulses according to a set-up such that, when receiving, the cycle will comprise 13 full waves of a signal having a period of ten milliseconds and, when transmitting, the same cycle will comprise 15 full waves of the same signal.

(A-2) A cycle stopping pulse which will block out the oscillator at the end of a cycle.

(A-3) When receiving, test pulses at the periods corresponding to the centers of the incoming series transmitted elements, and, when transmitting, a time distribution of the outgoing parallel stored elements, without noticeable distortion.

(A-4) A transfer pulse controlling the transfer of the informations stored in a primary recording stage to a secondary stage, this transfer occurring at a different time depending on whether a transmitting or a receiving cycle is concerned.

(A-5) A pulse controlling the initiating device of the translaterprinter mechanical cycle;

(A-6) A pulse allowing the energization of those of the code electro-magnets which correspond to marking elements;

(A-7) The time delay of the subscriber's number transcribing device during the required number of cycles;

(A-8) The generation of regularly spaced pulses enabling the detection of any extra-arhythmic signal and mostly of the switching signals.

(B) A test set intended to transmit or not the test pulses mentioned in the preceding paragraph A-3, to a primary recording stage depending on whether the incoming code elements are marking or spacing elements.

(C) A primary recording stage intended to store temporarily the whole group of elements corresponding to a same character, these elements coming either from the test set in the case of a receiving cycle or from the keyboard or from the automatic "Here is" transmitter in the case of a transmitting cycle; the origin of the stored elements (either received or to be transmitted) being segregated automatically by an adequate discriminating device.

(D) A primary reset device intended to transfer toward a secondary recording stage the signals previously stored in the primary recording stage and to reset the primary recording stage, the transfer occurring at different times of the cycle depending on whether a transmitting or a receiving cycle is concerned, the selection of these times being achieved automatically thanks to the discriminating device mentioned in the preceding paragraph and to a similar discriminating device included in the secondary recording stage;

(E) A secondary recording stage intended to store temporarily the whole group of elements corresponding to the character previously stored in the primary stage, this secondary recording stage being completed by a discriminating device whose structure is similar to the one in the primary recording stage and which secures the indication of origin of the elements (either received or to be transmitted) previously supplied by this discriminating device;

(F) A secondary reset device intended to cancel the information recorded by the secondary recording stage, after a predetermined delay sufficient for the translator-printer to record them in its turn.

(G) A power amplifier set for the energization of the electro-magnets of the translator-printer.

(H) A set of electro-magnets intended to materialize mechanically the information coming from the previously disclosed electronic part.

(I) A manipulation set intended both for signaling a keyboard key being depressed (in other words that it is a transmitting cycle) and to characterize this key by sending its corresponding code; the code pulses are sent to the primary recording stage and the said keyboard manipulation is, on the other hand, rendered inoperative when the set cannot or must not transmit the character corresponding to the depressed key. The keyboard comprises also two special keys allowing respectively a systematic repetition of the character corresponding to a depressed key and the initiation of the local subscriber call automatic transmission;

(J) A transmitting device intended to control the outgoing modulation relay according, on one hand, to the code element stored in the secondary recording set and, on the other hand, to the time base information, this device being also placed under the control of the following elements:

(J-1) Discriminating secondary transmission-reception device which prevents any codification in the case of a receiving cycle;

(J-2) Local subscriber call number automatic transmission device preventing any codification during the lapse of time necessary to ensure a separation between the termination of local subscriber call number request reception and the start of the effective transmission of this same call number;

(J-3) Device detecting the service condition of the receiving channel in order to ensure the retransmission of the switching signal to the transmitting channel.

(K) A device for detecting at reception the combination "Figure," intended to detect and materialize the reception of the Figure combination and to keep track of it until the reception or the transmission of the "Letter" combination.

(L) An automatic subscriber call number transmitter, intended to transmit automatically the local call number either following the key "Here is" being depressed or following the reception of the double combination "Figure D," this set comprising also a device to render the keyboard inoperative during the subscriber call number automatic transmission.

(M) An urgent call signalling device intended to initiate a visible and/or audible signal, and operating in the following cases:

(M-1) Reception of the double combination "Figure J".

(M-2) Reception of the connection signal when the machine is voluntarily blocked by a keylock mechanism.

(M-3) The paper supply being absent or running out;

This visible or audible signal will continue until the receiving operator intervenes;

(N) A detecting device of the channel service condition, intended to detect, materialize and retransmit the usual switching signals and to control locally the various devices coming into play when the channel changes its conditions.

Figure 1A:
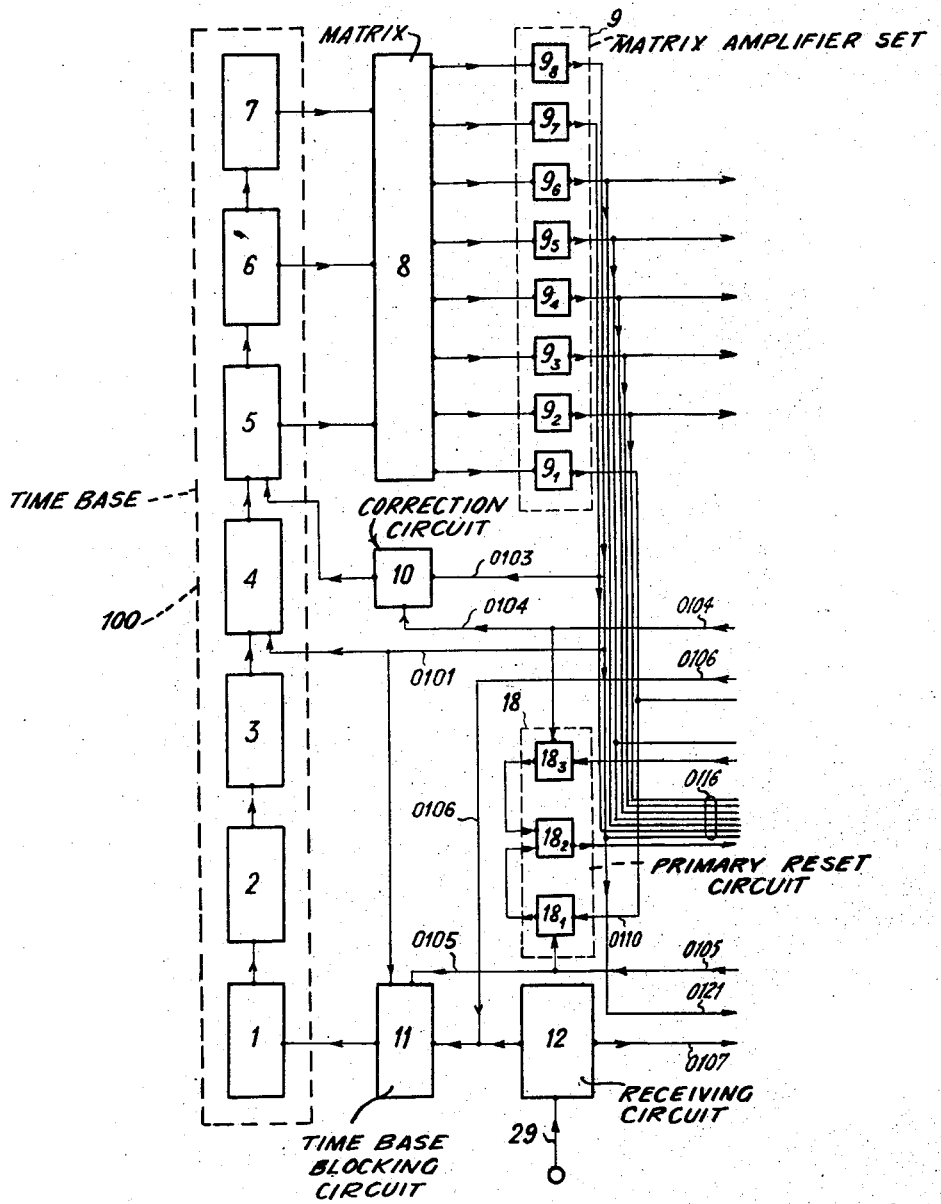
Fig. 1 is a semi-block diagram of the invention.

The present invention derives its above-mentioned advantages from the following means (Fig. 1):

(A) A time base which is denoted as a whole by reference number 100 and comprising:

A blocking oscillator 1 having a frequency of 100 c./s., supplying a sine voltage used as a time reference; a clipper 2 which transforms this sine voltage into a series of square waves from which short duration pulses can be derived;

A pulse amplifier 3 which provides a sufficient voltage level to actuate the subsequent circuits;

Four binary cascaded demultipliers 4, 5, 6, 7. The first demultiplier 4 receives the pulses coming from 3 and triggers at a frequency of 50 c.p.s. The second demultiplier 5 receives the pulses coming from 4 and triggers at a frequency of 25 c.p.s. The third demultiplier 6 receives the pulses from 5 and triggers at a frequency of 12½ c.p.s. Finally the fourth demultiplier 7 receives the pulses from 6 and triggers at a frequency of 6.25 c.p.s.;

A matrix having three inputs fed by the demultipliers 5, 6, 7 and 8 outputs providing the 8 possible combinations of condition of the said demultipliers 5, 6, 7.

A set 9 of eight matrix amplifiers $9_1$ to $9_8$ intended to amplify the signals available from eight bus bars 801–803;

A systematic correction circuit comprising connections 0101 and controlled by matrix amplifier $9_8$, at the time 140 milliseconds in each cycle and leading to the binary trigger 4. This circuit thus shortens the total cycle by 10 milliseconds, reducing it from 160 to 150 milliseconds which is the standardized duration of a transmitting cycle;

A second correction circuit 10 controlled by matrix amplifier $9_7$ and connected to binary trigger 5. This circuit can eventually, in the case of reception, reduce the cycle to 130 milliseconds. It is controlled through connection 0103 and it comprises essentially a gate whose opening is controlled by the secondary transmission-reception trigger $15_1$ through connection 0104.

A blocking device 11 allowing the oscillator to be cut-off or to free run at the required periods. This device is unblocked (and consequently oscillator 1 oscillates) either by the incoming modulation receiving trigger 12 as soon as a start element is received on the receiving wire 29 or by the primary transmission reception trigger $14_1$ through connection 0105 when a character, coming either from keyboard 19 or from automatic subscriber call number transmitter $22_2$, is to be transmitted.

The blocking device 11 blocked (and consequently oscillator 1 is stopped) at the end of the cycle by matrix $9_8$ amplifier through connection 0101.

This stoppage is also controlled by the communication end signal detecting device $24_1$ through connection 0106.

(B) A test set 13 comprising 5 test elements $13_2$ to $13_6$ whose function is to prevent or not the test pulse transmission, the said pulses coming from the matrix amplifier $9_2$ to $9_6$ and going to the primary recording circuits $14_2$ to $14_6$.

In the present set-up, the test pulses are effectively intercepted:

Each time the machine undertakes a transmitting cycle which results in a signal coming from the secondary transmission-reception trigger $15_1$ through connection 0104.

Each time, during a receiving cycle, a negative modulating element corresponding to a mark, is received by the incoming modulation receiving trigger 12, which results in a signal through connection 0107.

(C) A primary recording set 14 comprising:

Five binary triggers $14_2$ to $14_6$ included, intended to record the received modulation test result and thus materialize the corresponding polarities of each element of said modulation.

These five trigger circuits are also used in the transmitting cycle, their positioning being the function of the keyboard 19 through the five connections 0108;

A bi-stable trigger $14_1$ whose function is to indicate whether the cycle relating to the modulation elements recorded in triggers $14_2$ to $14_6$ is a transmitting or a receiving cycle.

Figure 2A:
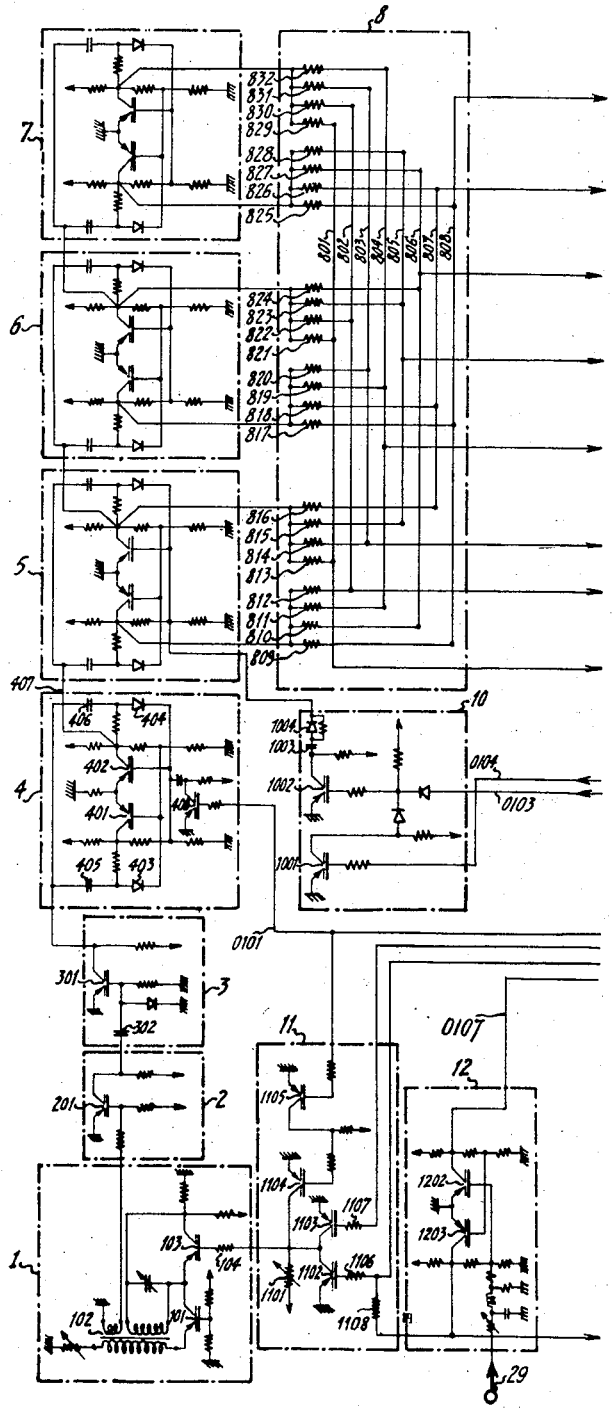
Fig. 2 is a schematic diagram of the invention.
Figure 2B:
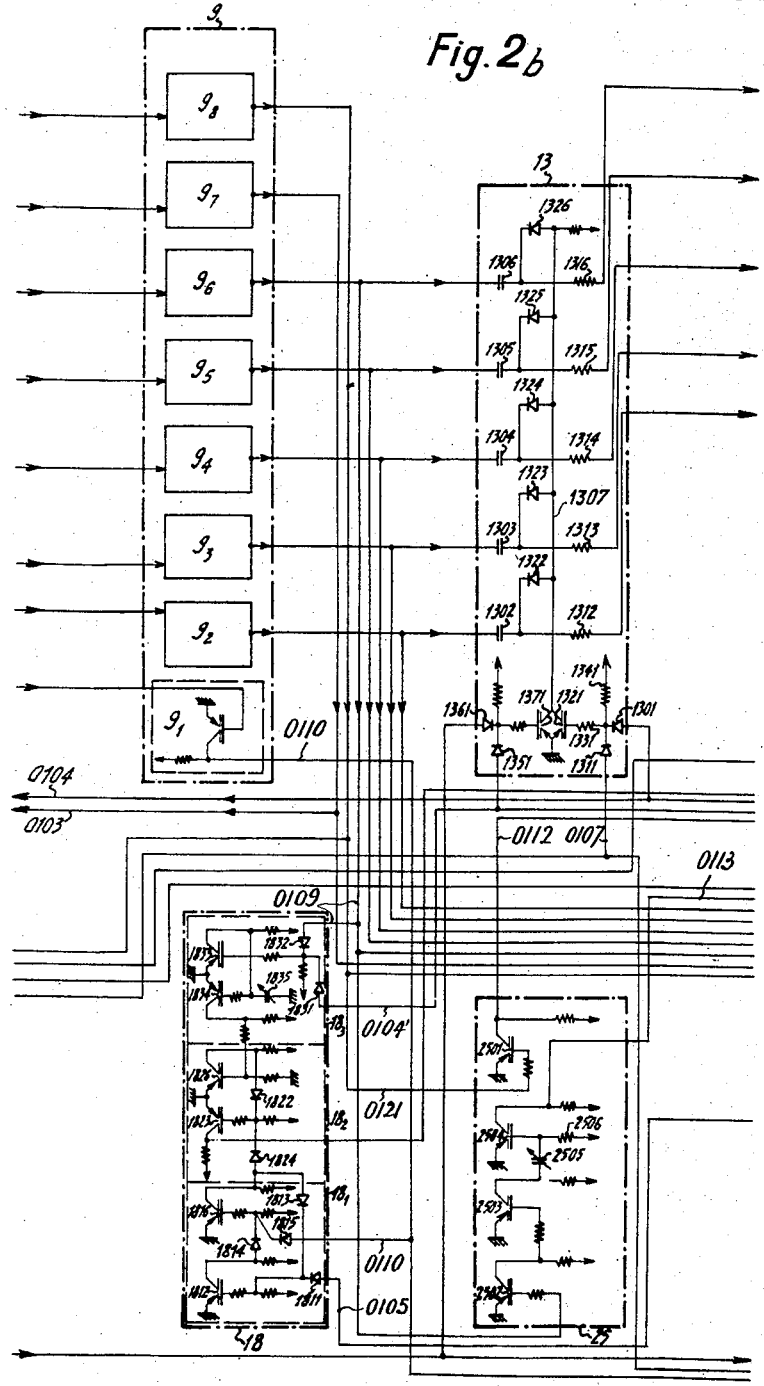

(D) A primary reset device 18 comprising an amplifier $18_2$ intended to supply reset pulses (one per cycle) itself controlled through gates $18_1$ and $18_3$, by either amplifier $9_1$ in the transmitting cycle through connection 0110 or amplifier $9_6$ in the receiving cycle through connection 0109. Selection between those two controls is accomplished by two gates $18_1$ and $18_3$ respectively controlled by trigger $14_1$ through connection 0105 and trigger $15_1$ through connection 0104 (Fig. 1a) or 0104' (Figs. 2b and 2c).

(E) A secondary recording set 15 comprising:

Five binary trigger circuits $15_2$ to $15_6$ in which the code elements, which were previously stored in the primary recording set 14, are transferred;

A binary trigger $15_1$ on which the cycle nature indication, which was previously recorded in trigger $14_1$ of primary recording set 14, is transferred.

The five binary trigger circuits $15_2$ to $15_6$ are intended to:

Control, after amplification, the positioning of the translator-printer codification electro-magnets $17_2$ to $17_6$ so as to allow the received character to be printed (in the reception cycle) or the transmitted character to be printed (in the transmitting cycle under local control);

To control the codification device during the transmission cycle.

(F) A secondary reset device comprising two independent devices; one of these $25_2$, controlled by matrix amplifier $9_8$ through connection 0121 causes the immediate reset of trigger $15_1$ through connection 0112;

The other, $25_1$ controlled by matrix $9_6$ amplifier through connection 0109 causes the delayed reset of the secondary recording trigger circuits $15_2$ to $15_6$ through connection 0113. This later arrangement is intended, in the special case of the receiving cycle, to maintain the secondary recording long enough to allow the positioning of the translator-printer code electro-magnets $17_2$ to $17_6$.

(G) A power supply amplifier set for the translator-printer comprising:

An amplifier $16_1$ for controlling electro-magnet $17_1$. This amplifier is controlled directly by amplifier $18_2$ of the primary reset device 18 through connection 0122.

Five amplifiers $16_2$ to $16_6$ for the code electro-magnets $17_2$ to $17_6$. The amplifiers $16_2$ to $16_6$ are placed under the dual control of the corresponding secondary trigger, respectively $15_2$ to $15_6$ and of a device $16_8$ intended to limit the excitation period of the code electro-magnets, the latter device itself being under the direct control of amplifier $18_2$ of the primary reset device 18 through connection 0122.

This limitation device is intended to limit the excitation period of the code electro-magnets so as to allow their de-energization to be achieved between two successive transmitting cycles. All these electro-magnets are therefore ultimately dependent on the primary reset device 18 and, consequently are positioned simultaneously;

An amplifier $16_7$ for the bicolor ribbon positioning electro-magnet. The intended object is to have the printing in two different colors depending on whether the printed character is received or transmitted.

(H) An electro-magnet set 17 located in the translator-printer comprising:

Five code electro-magnets $17_2$ to $17_6$ intended to control the positioning of the translator-printer code bars;

An initiating electro-magnet $17_2$ intended to initiate the translator-printer mechanical cycle;

A positioning control electro-magnet $17_7$ for the bicolor ribbon.

(I) A manipulation set 19 comprising mainly a keyboard $19_1$ arranged to cause, each time a key is depressed:

The systematic positioning of trigger $14_1$ through connection 0114;

The eventual positioning of the primary recording triggers $14_2$ to $14_6$ corresponding to the depressed key code combination. These triggers are controlled through the five connections 0108.

The keyboard is equipped with a no-operation device rendering a depressed key inoperative when the set cannot or must not transmit the character corresponding to the depressed key.

Depressing a key is mainly inoperative in the following instances:

A key being accidentally depressed during the automatic subscriber call number automatic transmission;

Maximum transmission speed allowed on the channel being exceeded, if this excess is relatively long-lived (short-lived speed excesses are reabsorbed by the primary recording set which is then acting as a storage device);

A key being depressed when the channel is in the non-connected service condition.

The keyboard comprises also a key "repetition" which, when simultaneously depressed with any key relative to a character, allows an automatic repetition of this character by bringing into play the repetition device $19_2$.

The keyboard comprises also a key "Here is" which, when being depressed, will play a part similar to the double combination "Figure D" receiving device and will cause a signal to be sent through connection 0115 and the subscriber call number transmitter $22_2$ to be initiated; the latter subsequent progression is insured by the progression device $22_3$.

(J) A transmitting device 20. This device is intended to secure the positioning of outgoing modulation transmitting relay $20_1$, on one hand as a function of time and the other hand as a function of the code elements stored in secondary recording set 15, or as a function of the information pertaining to the signaling of the channel service condition.

It comprises essentially a telegraphic relay controlled differentially by an amplifier $20_2$, itself controlled by a codification set $20_3$.

This codification set $20_3$ is dependent on the following devices:

Group 9 of matrix amplifiers $9_2$ to $9_8$ which insure the time distribution (connection 0116);

Group of secondary recording triggers $15_2$ to $15_6$ which secures the codification as a function of the character to be transmitted (connection 0117);

Secondary transmission-reception trigger $15_1$ which prevents any codification in the case of a receiving cycle (connection 0104);

Subscriber call number automatic transmission device 22 preventing any codification during the time interval necessary to secure the separation between the termination of the subscriber call number request reception and the beginning of the effective transmission of this same call number (connection 0118);

Device 24 for detecting the receiving service condition intended to secure the retransmission of the switching signals on the transmitting channel (connection 0119).

(K) A device 21 for detecting at reception the combination "Figure." This device is intended to detect and materialize the reception of the "Figure" combination and to keep track of it until the "Letter" combination is either received or transmitted. This function constitutes the first part of the compound signal detection function whose first information element is the "Figure" combination e.g. "Figure J" (urgent call), "Figure D" (subscriber call number requested) etc.

(L) A subscriber call number automatic transmitter 22. It is intended to transmit automatically the call number of the station to which it is associated. This transmission can be initiated either locally by keyboard button "Here is" (through connection 0115), or by the reception of the "Figure D" combination (through connection 0120);

This transmitter comprises a detecting set $22_1$ of the combination "Figure D," a subscriber call number storing and reading device $22_2$ and a progression device $22_3$.

(M) An urgent call signalling device 23. This device is intended to initiate a visible and audible signal in the following cases:

Reception of the "Figure J" combination through the group of connections 0117 and 0120;

Reception of the connection signal (receiving wire 29 goes from permanent negative to permanent positive) when the machine is voluntarily blocked by blocking key $23_5$ being brought into play;

Lack of exhaustion of the paper supply materialized by the spring-contacts group $23_6$.

This visible or audible signal lasts until the receiving operator intervenes.

Device 23 comprises:

A device 23, intended to detect the double "Figure J" combination (connection with device 21 of "Figure" combination detection through connection 0120);

A relay $23_2$ whose function is to control the visible and audible signalling;

A key $23_3$ intended to stop the ringing;

A device $23_4$ whose function is to detect the connection signal and operating in connection with the keylock mechanism $23_5$;

A spring-contact group $23_6$ whose function is to signal the lack or exhaustion of the paper supply.

(N) A channel service condition detecting device 24. This device generally called "termination device" is intended to detect, record and retransmit the usual switching signals; it is also intended to control locally the various devices being brought into play when the channel switches its service condition.

It comprises essentially a counting device $24_1$ capable of assuming four states. The first of these states is an initial state in which the device is being brought or held as soon as the signal corresponding to the service condition "in operation" or "busy" appears on receiving wire 29. If this signal is absent, the device is brought successively to the other three states by a timing control which is, in the present case, derived from the time base. When the device reaches this last state, the termination signal reception is materialized and causes every useful signalling (retransmission of the disconnection signal on the transmitting wire turning off the connection pilot light, stopping the motor etc.).

A relay 24₂ secures the signalling retransmission toward connection pilot light 27 and motor 26, whereas keys 24₃ and 24₄ cause respectively, by manual control, the transmission of the connection and deconnection signals on the transmitting wire.

Figure 2D:
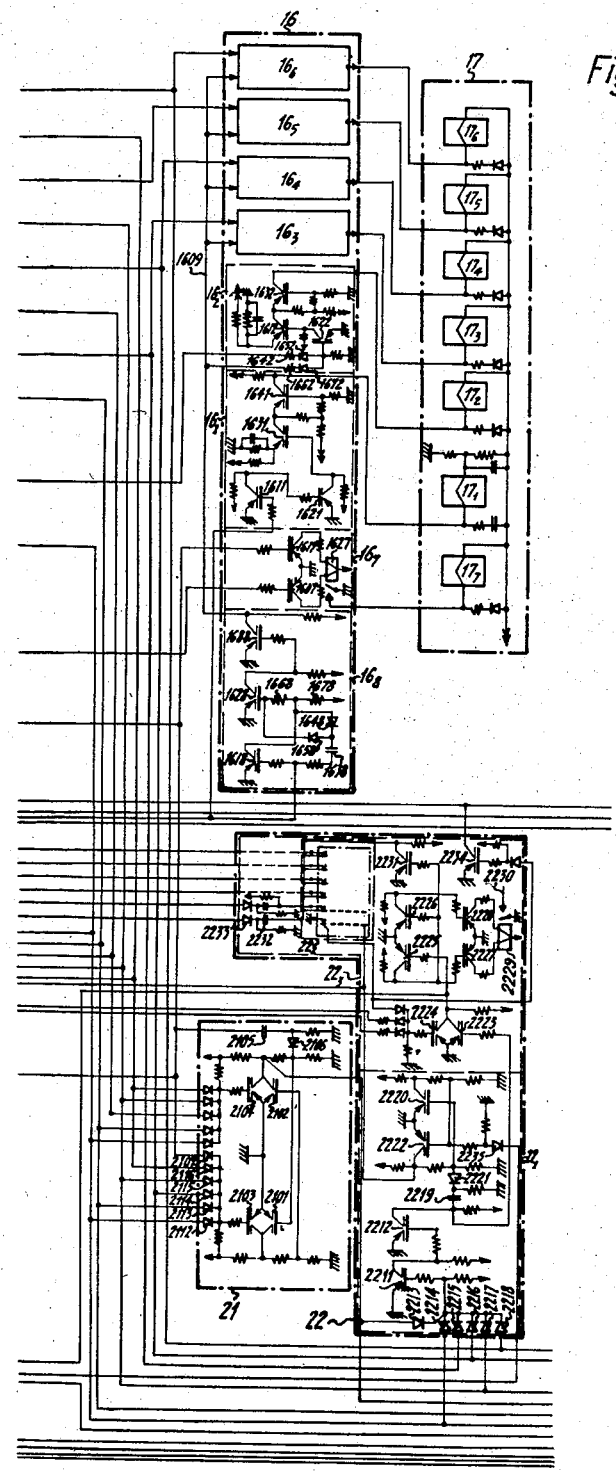

The detailed circuits of Fig. 1 are shown in Fig. 2.

(A-1) The oscillator 1 is made up of a transistor 101 whose emitter and collector circuits are coupled by a transformer 102 tuned to the 100 c.p.s. frequency.

(A-2) The sine voltage delivered by this oscillator is applied to the clipper 2, more precisely to the base of the transistor 201, operating as a so-called "common emitter" amplifier, very highly saturated, and which forms the essential part of this clipper. On this transistor 201 collector, a square wave voltage is taken, which is differentiated by capacitor 302 to obtain a series of short pulses alternatively positive and negative, and corresponding with respect to time to the steps of the above mentioned square wave voltage.

(A-3) These pulses are applied to the base of transistor 301 operating as a class C amplifier. It results that only the negative pulses will be amplified and appear on the said transistor collector as positive pulses.

(A-4) These positive pulses are, in turn, applied through rectifiers 403 and 404 and capacitors 405 and 406 to the bases of both transistors 401 and 402, e.g. of the P.N.P. type, assembled here according to the well known "Eccles-Jordan" trigger circuit and forming the essential part of binary demultiplier 4. Let us assume the right transistor 402 is conducting at some given time; then its collector potential is almost zero. This results in the base potential of left transistor 401 being also zero. It follows that the latter is cut-off and its collector potential highly negative. As a result, the base potential of the right transistor 402 is also very highly negative which keeps this transistor conducting. The assembly is therefore stable.

A similar reasoning would show the existence of a second stable state, symmetrical to the first one and corresponding therefore to a collector at low potential on the left and a collector at high negative potential on the right.

The output voltage of pulse amplifier 3 is applied simultaneously, as has been shown, to each of the two bases of transistors 401 and 402 through diodes 403 and 404. But, since the two transistors 401 and 402 are connected in a "trigger" assembly, one of the diodes 403 or 404 is cut-off, while the other is conductive. If, for instance, the left transistor 401 is conductive, its collector potential is near zero. Diode 403 connected to the base of this transistor is then conductive. In the right transistor 402, however, the voltages are reversed. The corresponding diode 404 is therefore cut-off.

Therefore, the pulse simultaneously applied to both bases cannot arrive at the base of the right transistor 402 but only at the base of the left transistor 401. This pulse, of positive polarity, reverses the polarity of the said base. It follows that the potential of the corresponding collector becomes highly negative and causes a polarity inversion.

The whole trigger assembly assumes an electrical condition symmetrical to the previous one.

Under these conditions, the right transistor 402 base is now ready to receive the next trigger pulse, as was previously the left transistor 401 base. The right transistor base receives the trigger pulse and the two transistor assembly will resume its original electrical condition. And so, and so forth; for each received pulse, the assembly changes its condition. On the output terminal 407 of this demultiplier, rectangular signals appear whose frequency is half the repetition frequency of the trigger pulses, i.e. 100 c.p.s. On the output 407 of the first demultiplier 4, the frequency is therefore reduced to 50 c.p.s.

The pulses issued from the demultiplier 4 control in turn demultiplier 5 whose operation is similar to that of demultiplier 4. At the output of this demultiplier 5, the trigger pulses, applied to demultiplier 6, have a 25 c.p.s. frequency.

At the output of demultiplier 6, the trigger pulses, applied to the last demultiplier 7, have been reduced to a repetition frequency of 12.5 c.p.s. At the out-put of demultiplier 7, the repetition frequency is 6.25 c.p.s.

The complete triggering period of demultiplier 7 would, if no correction were applied, then last $$\frac{1000 \text{ ms.}}{6.25} = 160 \text{ milliseconds}$$

It is shown, below, how, to comply with standardized practice, this complete period is reduced to 150 milliseconds when transmitting, by a correction applied to demultiplier 4 and reduced to 130 milliseconds, when receiving, by an additional correction applied to demultiplier 5.

(A-5) The rectangular voltages produced by demultiplier 5, 6 and 7 are distributed onto the eight bars 801 to 808 of a matrix 8 through a group of resistors 809 to 832, so as to combine the 8 possible combinations of the three binary demultiplier signals into a signal on only one of the 8 bars 801 to 808. Thus bar 801 will be at this maximum characteristic potential when demultipliers 5, 6 and 7 will all have their right transistors conducting (collectors at the maximum potential).

In the same way, bar 802 will be at this characteristic potential when, demultipliers 6 and 7 being in the same condition as the one explained above, binary demultiplier 5 will have its left transistor conducting.

And so on, bars 801 to 808 being successively subjected to the characteristic potential, as demultipliers 5, 6 and 7 feeding these bars progressively go through their successive switching conditions. It is to be noticed that in the present embodiment, the characteristic potential considered is the maximum potential obtained on the matrix bars. It is obvious that with a proper embodiment an identical result could be obtained if the minimum potential of the bars were to be taken as the characteristic potential.

(A-6) Each bar 801 to 808 is connected to one of the corresponding saturated amplifiers $9_1$ to $9_8$. These amplifiers are designed so as to respond exclusively to the characteristic potential of the corresponding bar. When this poential appears as an input signal for an amplifier, the transistor forming said amplifier is cut-off and its collector, whose current flow is stopped, becomes highly negative.

The selected embodiment is such that finally the collector of each amplifier $9_1$ to $9_8$ is in turn (and in its numerical order) highly negative during one telegraphic unit time interval.

Thus, in the given example, and leaving aside the correcting devices, amplifier $9_1$ would have its collector highly negative at the beginning of the cycle, during the first 20 milliseconds.

Amplifiers $9_2$, $9_3$, $9_4$, $9_5$, $9_6$, $9_7$, and $9_8$ in turn, have their collectors highly negative respectively from 20 to 40 milliseconds, from 40 to 60, 60 to 80, 80 to 100, 100 to 120, 120 to 140, 140 to 160 milliseconds, the beginning of the cycle being taken as the time origin.

(A-7) Actually this time distribution is modified by the correcting devices. A first correction is brought about by a pulse taken at the end of the cycle from amplifier $9_8$ and applied systematically, in all cases, on binary demultiplier 4 through a phase-inverting transistor 408, which results in reducing, in the given example, the cycle duration to 150 milliseconds.

(A-8) When receiving exclusively, a correction signal is taken from amplifier $9_7$ and transmitted to binary demultiplier 5, under the control of correction-preventing gate 10. This gate comprises a transistor 1002 placed under the dual control of amplifier $9_7$ and transistor amplifier 1001 itself controlled by secondary transmission-reception trigger $15_1$, said trigger, as already indicated, discriminating between the transmission and the reception phases.

Each of these two controls can by itself keep transistor 1002 of gate 10 cut-off, regardless of the condition of the other control. Under these conditions, the negative square-wave voltage produced by amplifier 9₇ can allow transistor 1002 to conduct only if the secondary transmission-reception trigger 15₁ is in a condition corresponding to a transmitting cycle, thus freeing the second control which, through 1001, was cutting off transistor 1002 of gate 10.

This double requirement occurs during the time amplifier 9₇ is conducting and if the cycle under consideration is a receiving cycle. Transistor 1002 of gate 10 then delivers a rectangular wave form signal which is differentiated by capacitor 1003. Of the two resulting pulses, only the positive one, produced by the second step of the rectangular wave form signal, is applied to binary demultiplier 5 through diode 1004.

This second correction, applied exclusively during the receiving cycles, reduces their duration to 130 milliseconds.

(A-9) Blocking device 11 controls a transistor 103 whose emitter-collector circuit is connected in parallel with the tank circuit of the oscillator of the time base. This transistor is normally conducting, a base current being applied to it through resistors 104 and 1101. Under these conditions, its collector-emitter impedance is very low, which results in the oscillator being damped to such an extent that there is no possible oscillation. To render the oscillator conducting, the base current of transistor 103 must be removed, which results in a very high increase of the emitter-collector impedance.

Several cases are to be considered as far as making the oscillator conduct:

(A-9-1) Receiving a telegraphic signal through the line: Receiving trigger 12, upon receiving a start element signal, unblocks transistor 1102 through which a ground potential is applied to the base of transistor 103. Transistor 103 becomes cut off and oscillator 1 begins to oscillate.

(A-9-2) Transmitting a telegraphic signal in the line: As soon as a character to be transmitted is stored in primary recording stage 14, primary transmission-reception trigger changes its condition, which results in allowing transistor 1103 to conduct, and since its function is similar to its counter part 1102 (see paragraph A-9-1 above) a ground potential is applied to the base of transistor 103 therethrough. Transistor 103 becomes cut off and oscillator 1 begins to oscillate.

In both cases, the oscillator, thus freed, starts to oscillate, which results in rectangular wave signals appearing successively on each of the matrix bars 801 to 808. Consequently, the corresponding matrix amplifiers are in their turn rendered operative: the collectors become successively negative during a time interval unit which corresponds to two periods of oscillator 1.

The end of the cycle is characterized by a highly negative potential appearing on matrix amplifier 9₈ collector. It may be seen that the collector of the matrix amplifier 9₈ becomes positive as soon as the matrix leaves its rest position. Consequently, the feed circuit of the base of transistor 103 is short-circuited to ground through both transistors 1104 and 1105, which retains the oscillator 1 in oscillating state even after the trigger signal which had caused oscillations to start disappears. The oscillations persist until, the matrix having gone through a complete cycle, the collector of the transistor forming matrix amplifier 9₈ again becomes highly negative. The short-circuit to ground which until then was applied through transistors 1102 and 1103 to the base of transistor 103, is then removed which results in lowering its collector-emitter impedance, and consequently, in oscillation 101 being cut-off.

The oscillator and auxiliary function circuits are designed in such a way that the oscillator blocking takes place at the very moment when the oscillation applied to clipper 201 base is symmetrical with respect to its axis. On the other hand, the said circuits are arranged so that conducting takes place starting from the same phase position. The oscillator will therefore deliver a complete number of periods at each cycle. Furthermore, the sustaining circuits are arranged so that the output oscillation amplitude is held constant whatever may be the order of the oscillations.

The oscillator, finally, goes from a blocking condition to a conducting condition, and vice-versa, without any appreciable transitory period.

It can be seen that auxiliary blocking transistor 103 can be systematically kept blocked by means of end device 24₁. This arrangement serves to prevent the oscillator from working when the receiving channel is in the position "Out of operation."

(B) Test set: The square-wave voltages delivered by matrix amplifiers 9₂ to 9₆ are differentiated through condensers 1302 to 1306 and supply alternate polarity pulses which flow respectively into resistors 1312 to 1316 and 1412 to 1416 (only 1412 is shown on Fig. 2). In the embodiment described, negative pulses only are used for testing thanks to to set of diodes such as 1402. Each one of these pulses is applied to a primary recording bi-stable element 14₂ to 14₆, provided the said pulse has not been cancelled by a possible short circuit realized by bar 1307 and applied in the following cases:

(B-1) Transmitting cycle: In this case, secondary transmission-reception trigger 15₁ changes its condition at the time of transfer from the primary to the secondary storage stages at the start of the transmission cycle initiated from the keyboard or from the call signal transmitter. The ground potential previously applied to diode 1301 is then replaced by a negative potential which results in said diode 1301 being cut off. The receiving channel being in a stand-by position, receiving trigger 12 is in a condition such that a negative potential is applied to diode 1311 which results in the latter being cut off. The combination of those two conditions described above, both diodes 1301 and 1311 being cut-off, allows a base current to flow into the base of transistor 1321 through resistors 1331 and 1341.

The emitter-collector impedance of this transistor is therefore reduced to a very low value, comprising thus an actual short-circuit (through diodes 1322 to 1326) of primary recording triggers 14₂ to 14₆ control circuits.

It is to be noticed that the reception of a start element followed by a combination of code elements modulation causes a ground potential to appear on diode 1311 with each negative element of the said combination; this results in short-circuiting the supply of the base of transistor 1321 thus raising to a high value this transistor emitter-collector impedance. Consequently the control circuit of primary recording trigger 14₂ to 14₆ is not short-circuited anymore. In the primary recording stage informations are therefore superposed which materialize, on the one hand, the character to be transmitted (local control of transmission) and, on the other hand, the received character. The local control then departs from the characters transmitted, which enables the operator to be informed of his correspondent's intervention, whenever this intervention occurs and regardless of the keyboard speed used by both correspondents.

(B-2) Receiving cycle: In this case, secondary emission-reception trigger 15₁ does not change its condition, which maintains diode 1301 conducting and diodes 1351 cut off. On the other hand diode 1361 is cut off through receiving trigger 12 whenever a negative element appears on the receiving channel. Under these conditions, the control circuit of primary recording triggers 14₂ to 14₆ is practically short-circuited by transistor 1371 which plays a similar part to that of transistor 1321 whose operation has been described above.

If, on the contrary, the received element is a stop element, diode 1311 is cut off. Consequently both transistors 1321 and 1371 offer simultaneously a high emitter-collector impedance, which results in freeing the control circuits of primary recording triggers $14_2$ to $14_6$ by blocking diodes 1322 to 1326. The change in condition of a primary recording trigger is exclusively subjected to the dual condition: on the one hand test pulse materializing the time corresponding in principle to the center of the code element to be analyzed and on the other hand, condition of the receiving trigger characterizing the polarity of said element.

(C) Primary recording set. When receiving, pulses coming from the test set and corresponding to a code element to be marked, are applied to primary recording binary triggers $14_2$ to $14_6$. These negative pulses go respectively through diodes such as 1402 to the bases of transistors such as 1422. Under their influence, these transistors become conducting and their respective collectors go from a near voltage supply negative potential to a near zero potential. As a result, the base potential of associated transistors such as 1432 is increased. The collector potential of these transistors which was previously close to zero becomes negative and reaches a value close to the voltage supply potential.

The change in condition of each of these binary triggers $14_2$ to $14_6$, when they receive a control pulse coming from the corresponding test sets, constitute the primary recording.

When transmitting, binary triggers $14_2$ to $14_6$ are actuated by pulses, negative in the given example, coming from keyboard $19_1$ whose operation is shown below. These pulses are applied directly to the bases of transistors such as 1422. It has been explained that if either transistor 1321 or 1371 is conducting, its collector potential becoming practically zero, bar 1307 will have the same zero potential, diodes 1322 to 1326 will then conduct and pulses coming from amplifier set 13 are derived to ground. This feature is being taken advantage of, when transmitting, to protect the primary recording of the information coming from the keyboard against the spurious markings which could eventually come from the test set. By applying this principle, when transmitting, transistor 1321 is normally conducting. In fact, control diode 1311 of transistor 1321 receives a negative potential which keeps it cut-off; this potential coming from the collector of transistor 1202, part of the receiving trigger 12 is the negative potential corresponding to the premanent positive potential which can normally be observed on the receiving line at this moment and which is applied directly to the base of transistor 1202. On the other hand control diode 1301 of transistor 1321 receives also a negative potential which drives it to cut-off, negative potential coming from transistor 1501 collector of trigger $15_1$ (secondary transmission-reception trigger). This transistor 1501 was cut off 10 milliseconds after depressing a character key on the keyboard; this cut-off, as will be explained later, was produced by a positive control pulse applied to its base and coming from transistor 1401 (primary transmission-reception trigger). Control diodes 1301 and 1311 being both cut off, a base current flows through resistors 1331 and 1341 and results in rendering transistors 1321 conducting, and consequently in practically driving to ground potential test control bar 1307. This results, as has been explained previously, in cancelling the pulses coming from matrix amplifiers $9_2$ to $9_6$.

(D) Primary reset device. Primary recording triggers $14_1$ to $14_6$ are reset at the required moment to their initial position by a common negative pulse applied to the base of transistors 1421, 1422 etc.

When receiving, diode 1831 is cut off by a negative bias coming from the collector of transistor 1521. Diode 1832 is cut off by a near zero potential delivered by matrix amplifier $9_6$ and prevents a base current from flowing into transistor 1833 throughout the start of the receiving cycle, until the instant of the test pulse relating to the fifth code element. At this moment, the collector of matrix amplifier $9_6$ becomes negative which results in cutting off diode 1832. Diodes 1831 and 1832 being then simultaneously cut off a base current flows into transistor 1833 which renders the latter conducting. Its collector potential therefore drops near zero which results in cutting off transistor 1834 whose collector becomes negative. This cut off is delayed by a few milliseconds thanks to capacitor 1835. This delay is motivated by the fact that a minimum amount of time is required to test the last code element and to record this test result in primary recording trigger $14_6$.

Switching transistor 1834 collector potential to negative allows a base current to flow into transistor 1826. The latter therefore conducts. Its collector potential drops near zero, rendering diode 1822 conducting, which results in removing transistor 1823 base current. The latter is therefore cut off and its collector applies a negative step signal to the reset bar 1407 of primary recording triggers $14_1$ to $14_6$. This negative step is differentiated by capacitors 1431, 1452. . . . The pulses thus obtained are respectively applied on one hand to the base of transistor 1421 through diode 1441 and on the other hand to the bases of transistors 1432 . . . through diodes 1442. . . . These pulses when applied to some transistors cause them to conduct. Consequently trigger set $14_1$ to $14_6$ constituting primary recording stage 14 is therefore brought back to its original condition.

When transmitting, diode 1811 is made to conduct by a near-zero potential taken from the collector of transistor 1402. Consequently, the base current is removed from transistor 1812 which is then cut off. Its collector becomes negative thus cutting off diode 1814.

At the start of the transmitting cycle, on the other hand, the output of matrix amplifier $9_1$ collector consists in a negative step signal which cuts off diode 1815. Diodes 1814 and 1815 being simultaneously cut off, a base current flows into transistor 1816. The latter is therefore brought to conduct and its collector drops to a near zero potential.

It will be noticed that transistor 1816 was made to conduct through the dual control of, on the one hand, matrix amplifier $9_1$, and on the other hand of primary transmission-reception trigger $14_1$. But this conductivity is maintained regardless of the state of trigger $14_1$. In fact the near zero potential, which was applied through diode 1811, is duplicated by an identical potential taken from the collector of transistor 1816 (just made to conduct) and transmitted by diode 1813. This arrangement is intended to give sufficient time to transistor 1816 to be made to conduct. The positive square-wave emitted by the collector of said transistor is applied to diode 1824 which results in removing current from the base of transistor 1823. The latter is therefore cut off and its collector output is a negative square-wave which is applied to primary reset bar 1407 thus causing primary recording stage reset, in exactly the same way as has been shown in the case of the receiving cycle.

(E) Secondary recording set: Primary transmission-reception trigger $14_1$ and recording triggers $14_2$ to $14_6$ which have been marked previously either in the transmitting or in the receiving cycle change their condition at the time of the primary reset. By doing this, they deliver a positive square wave through the collectors of transistors 1401, 1432. . . . This square wave is differentiated by capacitors 1511, 1512. . . . As a result, on each of the circuits so arranged, a positive transfer pulse is applied respectively to the base of transistors 1501, 1502 . . . through diodes 1531, 1532. . . . These of the triggers $15_1$ to $15_4$ receiving this transfer pulse will change their condition. It follows that secondary recording stage set is given an identical condition to that of primary recording stage before the latter was reset.

(F) Secondary reset device.

(F-1) Secondary transmission-reception trigger $15_1$ reset: At the end of each cycle, matrix amplifier $9_8$ delivers through its collector a negative square wave which is applied to the base of transistor amplifier 2501. The collector of the latter then delivers a positive square wave whose first step is differentated by capacitor 1541. The resulting pulse is transmitted to the base of transistor 1521 base through diode 1551 which causes transistor 1521 to be cut off and, consequently secondary transmission-reception trigger $15_1$ reset.

(F-2) Secondary recording trigger $15_2$ to $15_6$ reset: When the output of matrix amplifier $9_6$ is a negative square wave, this output is transmitted to the base of transistor 2502 base which is made to conduct. The collector output then consists in a positive square wave which is transmitted to the base of transistor 2503 base whose collector output consists then in a negative square wave. Both steps of this square wave are differentiated through capacitor 2505 and the resulting pulses are applied to the base of transistor 2504. The latter is normally conducting thanks to a base current applied permanently through resistor 2506. The first pulse applied to the base of transistor 2504, being negative, has no effect other than to confirm that transistor 2504 is conducting. On the contrary, the second pulse, which is positive, cuts off transistor 2504 whose collector gives it then a negative step signal.

Transistor 2504 thus remains cut off during a period of time which is a function of the values of capacitor 2505 and of resistor 2506, the assembly of these two elements constituting a time-constant circuit. After a period of time determined by this time constant, transistor 2504 is made to conduct under the effect of the base current which is applied to it through resistor 2506 and its collector then delivers a positive step signal. Summing up the collector of transistor 2405 delivers a negative and a positive step signal whose time separation is a function of the values of capacitor 2505 and resistor 2506. Both steps of this square wave thus formed are differentiated by capacitors such as 1542. . . . Two pulses result therefrom. The first one, negative, is rendered inoperative by diodes 1522. . . . The second one goes through these same diodes to the base of transistors 1502. . . . Consequently these transistors are cut off and secondary recording triggers $15_2$ to $15_6$ brought back to their original condition.

(G) Power supply amplifier set for the translator-printer electro-magnets.

(G-1) Initiating electro-magnet control amplifier: This amplifier consists of four transistors 1611, 1621, 1631, 1641 operating as D.C. amplifiers. At the time of the primary reset, the collector of transistor 1823 delivers a negative square wave which is applied to the base of transistor 1611. This last transistor is therefore made to conduct. Its collector then delivers a positive square wave which is applied to the base of transistor 1621, which is made to conduct and in its turn its collector will deliver a negative square wave. The latter is applied to the base of transistor 1631 which results in transistor assembly 1631 and 1641 being made to conduct, in accordance with the sequence of operations disclosed in our U.S. patent application Ser. No. 641,701, filed February 21, 1957, now Patent 2,835,829, issued May 5, 1958, entitled "Circuit for Switching High-Voltage Using Cascade-Connected Low-Voltage Transistors."

(G-2) Code electro-magnets control amplifiers: Each amplifier comprises three transistors, e.g. 1612, 1622 and 1632 for amplifier $16_2$. Transistors such as 1622 are kept conducting by the base current coming from the collector of secondary recording set transistor 1502, through resistor 1642 and diode 1652 and/or from the collector of transistor 1688 through resistor 1662 and diode 1672.

This first current is removed every time corresponding secondary recording trigger $15_2$ to $15_6$ has recorded a stop element (in the given example). The second of these currents is removed by time constant device $16_8$ whose operation is as follows. The collector of transistor 1823 delivers a negative square wave at the time of the primary reset, which is applied to transistor 1618 base which in turn is made to conduct, thereby delivering on its collector a positive square wave. The latter is applied to the base of transistor 1628 which is cut off and whose collector will, consequently, deliver a negative square wave.

At the start of 1823 square wave output, capacitor 1638 is charged through diode 1648. And the end of this same square wave, capacitor 1638, having discharged through diode 1658, supplies a positive pulse to the base of transistor 1628, which results in keeping the latter cut off for an additional period of time determined by the values of capacitor 1638 and resistors 1668 and 1678. The negative square wave thus obtained on the collector of transistor 1628 is applied to the base of transistor 1688. Its collector will then deliver a positive square wave to bus bar 1609, which removes the second base current to the group of transistors such as 1622.

If the first base current is also simultaneously removed, transistors like 1622 are cut off and their collectors give a negative square wave output. This output signal is applied to the bases of transistors 1612 . . . which makes the transistor assembly 1612 and 1632 . . . conduct, thus causing corresponding electromagnets $16_2$ to $16_5$ to be energized.

(G-3) Control amplifier of the bi-color printing electro-magnet: This amplifier comprises two transistors 1607 and 1617 assembled as D.C. amplifiers and controlling differentially a polarised relay 1627. The bases of transistors 1607 and 1617 are respectively connected to the collectors of secondary transmission-reception trigger $15_1$.

Consequently, relay 1627 follows faithfully the said trigger condition switches. Through its contact, this relay controls electro-magnet $17_7$ excitation whose change in condition brings about the printing color switching.

(H) Translator-printer electro-magnets assembly: Sub-assembly 17 represents in a block-diagram form the various electro-magnets $17_1$ to $17_7$, their connections with power supply amplifiers $16_1$ to $16_7$ as well as the classical anti-overvoltage device used in conjunction with each of these electro-magnets.

(I) Manipulation set: A key being depressed causes, by a mechanical arrangement not included in the present invention, the systematic switching of spring assembly 1911 and the eventual switching of spring assemblies 1912 to 1916, according to the code corresponding to the depressed key.

In a stand-by position, capacitor 1917 is charged negatively from the feed battery of the collector of transistor 1401 of primary transmission reception trigger $14_1$. When a key is depressed, spring 1911 switches and the condenser discharges causing a negative pulse to be transmitted to the following circuits:

(I-1) Systematically to the base of transistor 1401, through diode 1451, which results in switching the condition of primary transmission-reception trigger $14_1$. Consequently, the collector of transistor 1401 drops to a near zero potential which prevents a negative recharge of capacitor 1917.

(I-2) Through spring 1912 to 1916, and according to the code corresponding to the depressed key, to the base of transistors 1422 . . ., through diodes 1918 to 1922, which results in causing a switch in the condition of primary recording triggers $14_2$ to $14_6$ which eventually can be brought into play.

It is to be noticed that capacitor 1917 transmits also a negative pulse to the base of transistor 2222, which results in bringing back to an adequate condition bistable trigger constituted by transistors 2220 and 2222, since the said trigger at the time the voltage is applied can occupy indifferently either one or the other condition.

The switch of condition of primary transmission-reception trigger $14_1$ initiates the time base oscillator. As a matter of fact, the potential of the collector of transistor 1421 becomes highly negative which results, in making transistor 1103 conduct. The latter, conducting, short-circuits the feed circuit of the base of transistor 103; the said transistor is therefore cut off and releases the oscillator as has been seen previously.

As has been seen (paragraph D, "Primary reset device") primary recording stage 14 is reset to its initial state whereas the recorded information is transferred to secondary recording stage 15. As soon as primary recording stage 14 has resumed its initial state, the collector of transistor 1401 becomes again highly negative, which results in charging negatively capacitor 1917. It is to be noticed that this capacitor can only be charged negatively when the primary recording stage has resumed its initial state i.e. is capable of recording a new combination. This arrangement releases the machine of its dependence on the keyboard mechanical blocking. If the operator depresses another key before the primary stage to freed, this key will be inoperative since capacitor 1917 cannot be recharged. Consequently depressing a new character cannot cause the alteration of the preceding character which is still stored in the primary recording set 14.

It can also be noticed that capacitor 1917 can only be recharged if the channel is in the position "out of operation." As a matter of fact, the charging circuit is then short-circuited through transistor 2455, itself made to conduct by a circuit whose operation will be explained when expounding the channel condition detecting device.

This same deterrent action is also obtained through transistor 2234 during the call signal automatic transmission, this transistor being itself made to conduct by a circuit whose operation will be explained when expounding the call signal automatic transmitting device.

The manipulation set described above comprises also some auxiliary devices whose operation is as follows:

(I-3) Repetition device: Depressing repetition key 1923 results in cancelling the base current of transistor 1924. The latter is then cut off and, consequently, its collector reaches a highly negative potential, which causes diode 1926 to be cut off. If, under these conditions, another keyboard key is depressed, the corresponding character is transmitted as indicated previously. Furthermore, the negative square wave delivered by matrix amplifier $9_1$ causes, while it lasts, diode 1927 to be cut off. Both diodes 1926 and 1927 are therefore simultaneously cut off, and a base current arises in transistor 1928. This base current, which coincides with the negative square wave delivered by matrix amplifier $9_1$ results in a positive square wave appearing on the collector of transistor 1928. This square wave is differentiated by capacitor 1929 and the pulses thus obtained are applied to contact 1911 always established since the key is depressed. Of the two pulses, the positive one is rendered inoperative by diode assembly 1918 to 1922, 1451 and 2235, while the negative one, playing a part similar to the pulse delivered by capacitor 1917, causes a new recording of the character to be transmitted.

It is worth while mentioning that, in the present example embodiment, it is necessary to depress the key "repetition" before depressing the key of the character which is to be repeated. This repetition takes place as long as both keys are simultaneously depressed, and stops as soon as either key is released. In the case where the keys are depressed in the reversed order of the one mentioned above, the repetition does not occur, and the character corresponding to the key which was depressed first is transmitted a single time. We are therefore again in the case of a normal transmission (non-repeated).

(I-4) Automatic call signal transmission local initiation device: Depressing key "Here is" 1925 short circuits the feed circuit of the base of transistor 2225 and causes the call signal to be transmitted automatically through a device whose operation will be explained to subsequent paragraph L.

(J) Transmitting device: Transmitting assembly 20 comprises:

(J-1) A transmitting device $20_1$ comprising mainly a telegraphic relay.

(J-2) A control stage $20_2$, comprising a two-channel amplifier.

(J-3) A codification device $20_3$. The transmitting device comprises a telegraphic relay $20_1$ fed at the center of its winding and controlled differentially by amplification device $20_2$, through limiting resistors 2001 and 2002. Each of these half-windings is shunted by one of the diodes 2003 and 2004 intended to dampen the voltages due to transient phenomena. Stationary contacts 2005 and 2006 are connected to the telegraphic batteries whereas the coil 2007 is connected to transmitting wire 28. The classical limiting and protecting resistors are not shown in the general drawing of Fig. 2.

Amplifier $20_2$ comprises two transistors 2021 and 2022 in a D.C. amplifier assembly, whose collectors control differentially telegraphic relay $20_1$. The control currents are applied to the bases of transistors 2021 and 2022 through resistors 2023 and 2024.

The two latter transistors are in turn controlled by the collectors of a phase-inverting amplifier, the said amplifier comprising transistors 2031 and 2033. The base current of transistor 2031 being obtained from the collector of transistor 2033, it follows that transistor 2031 is always in a condition opposite to that of transistor 2033.

In a stand-by position, transistor $9_8$ of matrix amplification assembly 9 is cut off. Its collector is therefore at a negative potential which permits a base current to flow into transistor 2033 through resistor 2034, diode 2035 and resistor 2036.

This results in transistor 2033 being made to conduct which results in turn in a spacing current being transmitted, through amplifier $20_2$ and transmitting device $20_1$, to the transmitting channel connected to armature 2007. As soon as the transmitting cycle starts, amplifier $9_8$ changes its condition, which removes the base current of transistor 2033. The latter is cut off and consequently a marking current is transmitted on the transmitting channel connected to armature 2007. This situation lasts a time unit interval duration which is equivalent to transmitting in line a marking element which constitutes a modulation cycle start element. At the end of this first time unit interval, amplifier $9_8$ is cut off, its collector becomes negative, which allows a base current to flow into transistor 2033 provided that diode 292 be cut off. This diode is connected to the collector of transistor 1552, the latter being part of secondary recording trigger $15_2$ whose condition is determined by the polarity of the first code element to be transmitted. If this element is a marking element, the collector of transistor 1552 is practically at zero potential. Diode 292 is therefore made to conduct, and consequently no base current can flow in transistor 2033; the latter therefore remains in its preceding condition and relay $20_1$ continues to transmit a marking current. If, on the contrary, the first code element to be transmitted is a spacing element, the collector of transistor 1552 is highly negative and diode 292 is cut off. Under these conditions, the base current, coming from the collector of transistor $9_2$, flows into transistor 2033 which switches its condition, causing therefore relay $20_1$ trigger. The latter then transmits a spacing current.

This spacing current duration is again that of a time unit interval. It stops when amplifier $9_2$ is made to conduct while amplifier $9_3$ is in its turn made to cut off. A sequence of operation similar to the one described, and bringing into play diode 293 and secondary recording trigger $15_3$ allows transmitting in line during a time unit interval an element whose polarity corresponds to the second code element to be transmitted. And so on matrix amplifier $9_4$, $9_5$ and $9_6$ concurrently with corresponding triggers $15_4$, $15_5$ and $15_6$, and respective diodes 294, 295, 296, allow transmitting in line the polarities corresponding to the third, fourth and fifth code elements of the outgoing modulation.

At the seventh basic interval, amplifier $9_7$ is cut off. Its collector, becoming highly negative, allows a base current to flow into transistor 2033. The latter is therefore made to conduct, and consequently, a spacing current is transmitted on the transmitting wire, thus constituting the first part of the outgoing modulation stop element. At the end of this time unit interval, amplifier $9_7$ is made to conduct while amplifier $9_8$ is in its turn cut off. When amplifier $9_7$ conducts, it removes the base current of transistor 2033 but this current is at this very same moment reestablished by the collector of amplifier $9_8$. Therefore the in line transmission of the stop current goes on and will last until a new cycle is initiated.

Amplifiers $9_1$ to $9_8$, playing similar parts in the receiving and transmitting cycle, the codification device $20_3$ must be prevented from operating during the receiving cycle. This result is obtained by using transistor 2032 whose emitter and collector shunt their counter part in transistor 2033. This transistor is normally kept conducting by a base current which is applied through limiting resistors 2037 and 2038. As long as transistor 2032 is kept conducting, transistor 2031 is cut off and modulation relay $20_1$ delivers a spacing current to transmitting wire 28, which takes place regardless of the condition of transistor 2033. When the cycle taking place is a transmitting cycle, secondary transmission-reception trigger $15_1$, is in a condition such that transistor 1521 is conducting. Its collector is therefore at a near zero potential which results in allowing diode 2039 to conduct. The base current of transistor 2032 is therefore removed. The latter is then cut off, leaving the codification device under the exclusive control of transistor 2033.

A similar device comprised partly by transistor 2040, prevents any codification during a determined time interval, at the start of the automatic call signal transmission. The control circuits of this device will be described when expounding the call signal transmitting device.

Finally, a marking current can be transmitted by making diodes 2041, 2042 and 2043 conduct simultaneously through "termination button" $24_2$.

(K) Detection device of "Figure" combination when receiving: This device comprises essentially a bi-stable trigger constituted by transistors 2101 and 2102. This trigger can be positioned by control transistors 2103 and 2104. It can also be brought back to its initial stage by a reset device which includes capacitor 2105 and diode 2106. When receiving the "Figure" combination, diode 2107 is cut off through the collector of transistor 1521, this collector being part of the secondary transmission-reception trigger in "receiving" position. Simultaneously diodes 2112 to 2116 are also cut off through the collectors of transistors 1552 . . ., in the position corresponding to the "Figure" combination.

Under these conditions, a base current flows into transistor 2103 which is made to conduct, which results in positioning the bi-stable trigger comprising transistors 2101 (which is then made to conduct) and 2102 (which is then cut off). As soon as the "Letter" combination appears on the secondary recording stage, similar phenomena will again take place, bringing into play transistor 2104 and the diodes located in this transistor base circuit.

It will be seen that the "Figure" positioning will take place exclusively when receiving the "Figure" combination whereas the initial position reset takes place as soon as the "Letter" combination appears in secondary recording stage 15, and this whether the cycle in question is a transmitting or a receiving cycle.

(L) Call signal automatic transmitter: The call signal automatic transmitter comprises three main subassemblies.

(L-1) A detecting device for receiving the double "Figure D" combination $22_1$, L-2) A device $22_2$ intended to store and read the call signal.

(L-3) A set $22_3$ intended to insure the reading device $22_2$ progression as soon as the latter has left its rest position. This rest position to which $22_2$ is brought back by $22_3$ can be left through a signal coming from either detecting device $22_1$ or from the keyboard button "Here is" 1925.

Receiving previously the "Figure" combination has placed device 21 in a condition such that diode 2213 is cut off. By a sequence of operations similar to the one which enabled device 21 to position, diodes 2214 to 2218 are cut off as soon as the "D" combination appears on secondary recording stage 15. Diodes 2213 on the one hand, and 2214 to 2218 on the other hand are simultaneously cut off and transistor 2211 is made to conduct. Its collector assumes a near zero potential which results in cutting off transistor 2212 whose collector delivers a negative step signal. This negative step signal is differentiated by capacitor 2219 and applied to the base of transistor 2220 through diode 2221. Consequently, the bi-stable trigger, formed by transistors 2220 and 2222 switches its condition, transistor 2220 becoming conducting whereas transistor 2222 is cut off. The collector of transistor 2222 thus becomes negative, which causes transistor 2040, of the transmitting device, to conduct. Consequently the latter is therefore maintained in a position where it transmits a spacing current, transistor 2040 playing a part similar to that of transistor 2032 with which it has a common emitter and a common collector. On the other hand, transistor 2212 being cut off has caused transistor 2223 to conduct and the collector potential of the latter drops near zero. Consequently transistor 2225 cuts off while transistor 2226 conducts. The two transistors constitute a phase-inverting amplifier stage. They control directly a two-channel amplifier stage, having two outputs in phase, opposition and constituted by transistors 2227 and 2228. This last stage itself controls relay 2229 which causes through wire 2230, the step-by-step magnet motor of a rotative switch to be energized, this rotative switch constituting the call signal storage reading device $22_2$. When secondary stage 15 is reset, the combination corresponding to "D" disappears, transistor 2211 is cut off, whereas 2212 conducts and 2223 cuts off. The two stage amplifier constituted by transistor 2225 and 2226 on the one hand, and 2227 and 2288 on the other hand, deenergizes relay 2229 which releases and opens the control circuit of the step-by-step magnet motor of rotative switch $22_2$ and therefore the latter is made to progress by one step.

It is to be noted that transistor 2231 has gone through the same cycle as transistor 2226, their bases being controlled by the same signal. The square wave delivered by its collector has been differentiated by transistor 2232. Two pulses have been thus obtained. Diode 2233 enables the negative pulse to be transmitted to primary transmission-reception trigger $14_1$. The latter switches its condition, which results in initiating a transmitting cycle as has been seen previously.

During this transmitting cycle, matrix amplifiers $9_5$ and $9_6$ deliver successively a negative square wave. These successive negative square waves are in fact a single negative square wave whose total duration is equal to two time unit intervals and which, applied to the base of transistor 2224, causes the latter to conduct. This transistor 2224 plays a part similar to that of transistor 2223 with which it has a common emitter and a common collector. Consequently at each transmitting cycle it allows call signal storing and recording device $22_2$ to move forward.

At each cycle, the codification of the call signal to be transmitted is obtained by positioning primary recording triggers $14_2$ to $14_6$, this positioning being obtained by eventually applying a negative pulse to the bases of transistors such as 1422. This pulse is obtained by differentiating the current emitted by the collector of transistor 2231 in the same way as the same current has been differentiated by capacitor 2232 for switching trigger $14_1$. As only some of triggers $14_2$ to $14_6$ are to be switched according to the call signal of the subscriber, certain terminals of the rotative switch constituting the codification stage $22_2$ are omitted and consequently the current of the collector of transistor 2231 is not differentiated by the corresponding capacitors and pulses are not applied to the triggers not to be switched.

It is to be noticed that during the first few cycles (the first four cycles for instance) systematically no modulation is sent to the transmitting wire. The transmitting and codification device is maintained in a position where it emits a spacing current by bringing transistor 2040 to conduct, as has been seen previously. This arrangement is intended to set aside a time interval between the reception of double "Figure" combination and the transmission of the first call signal character. At the $n$th cycle (the fifth one in the given example), a brush of device $22_2$ applies a zero potential to the collector of transistor 2222, which causes the bistable trigger 2220—2222 to switch its condition, and to the base of transistor 2040 which causes said transistor to be cut off. Consequently the transmitting device is released and can transmit effectively the modulation.

When the call signal has been completely transmitted, device $22_2$ having gone through a whole cycle resumes its initial position. In this position, a brush, in contact with a special pin, applies a zero potential to the base of transistor 2224 which becomes blocked. Progression of device $22_2$ is therefore stopped. The same thing will apply to the time base which receives no more initiating pulses.

It can be noticed in the first place, that since device $22_2$ has left its rest position, the zero potential is removed from the base of transistor 2234. The latter conducts and a zero potential appears on its collector thus discharging capacitor 1917, part of the manipulation device 19 which renders inoperative any inopportune keyboard manipulation. This preventive measure is removed as soon as the transmission of the call signal has been completed, device $22_2$ in its rest position applying again the zero potential to the base of transistor 2234, which cuts off the latter and thus allows capacitor 1917 to charge.

In the second place, an inopportune blocking of the transmitting device could result from an eventual defective positioning at the time when voltage is applied, for instance, to the bi-stable assembly comprising transistor 2222 and 2220. To prevent this, the bi-stable assembly, at each keyboard manipulation, receives a reset pulse issued from capacitor 1917 which is applied to the base of transistor 2222, through diode 2235.

(M) Urgent calls signaling device: This device is intended to initiate an audible or visible call, or at any rate a call perceived by the operator, so as to draw his attention in the following cases:

(M–1) Receiving the double combination "Figure J" transmitted by a correspondent;

(M–2) Paper incident (supply exhausted, break . . . );

(M–3) Reception channel being taken by a correspondent, when the blocking key is in operation.

When receiving the double combination "Figure J," diodes 2311 to 2316 are cut off by a sequence of operations similar to the one already used for detecting the double combination "Figure D." Transistor 2317 is made to conduct, which results in transistor 2318 being cut off. The collector of the latter is therefore at a negative potential which allows transistor 2319 to conduct. It is to be noticed that the latter, when conducting, practically short-circuits the right winding of relay $23_2$. This relay comprises two equal windings assembled in series and differentially. Consequently, when there is no outside control, the relay is normally in its rest position, the fluxes generated by these two windings cancelling mutually. When transistor 2319 conducts, the flux generated by the right winding is practically removed, whereas the flux generated by the left winding increases since the current is increasing in this winding.

The relay is thus energized, and through its contact 2321, short-circuits definitely its right winding, which enables relay $23_2$ to remain in a work position, after the double signal "Figure J" which had caused transistor 2319 to become conducting disappears. Through its contact 2323, this relay $23_2$ allows pilot light 27 to be lit intermittently, the rhythm being obtained by one of the usual means (auxiliary cam for instance). Removing this urgent call signal is obtained by operating key $23_3$ which removes the short-circuit of the right winding of relay $23_2$. This relay is thus reset differentially. It de-energizes; to its contact 2321 opens releasing definitely the right winding short-circuit, which consequently will not be reestablished when key $23_3$ is released. Its other two work contacts being open when it is de-energized, the other controlled signals are thus removed.

In the case of a paper incident, contact $23_6$ is established mechanically causing the right winding of relay $23_2$ to be short-circuited, and the said relay will operate as has just been explained. On the other hand, signalling is carried out, from this same contact, to the channel condition detecting assembly 24, in order to cut off the communication which is taking place. The detailed operation of this last part will be studied in the following N paragraph.

Operating blocking key $23_5$ prevents teleprinter from being taken, as will be expounded in the following N paragraph. If reception channel 29 is taken when blocking key $23_5$ is on its work position, the operator must be informed by the urgent call signaling being brought into play.

Therefore, as soon as a spacing current appears on receiving channel 29, transistor 1202 is cut off and transistor 1203 is made to conduct. The collector of the latter drops to a zero potential which results in transistor 2341 being cut off. The collector of the latter becomes negative, which causes transistor 2320 to conduct. This transistor plays a part similar to that of transistor 2319 with which it has a common emitter and a common collector. It follows that, in the present case, the relay $23_2$ will come to work, causing the signalling indicated above.

(N) Channel service condition detecting device: This device is intended to detect the service conditions of the receiving channel which are characterized by a long duration spacing current when the channel is busy and by a long duration marking current when the channel is free. In the present case, a long duration current means a current lasting at least 290 milliseconds.

The operation is as follows: As soon as a spacing current appears on the receiving channel, thus characterizing the taking of the channel by a calling subscriber or by the exchange, transistor 1202 is cut off. The potential of its collector becomes highly negative, which results in bringing transistor 2453 to conduct. The collector of the latter assumes a near zero potential which results in cutting off transistor 2452 whose collector becomes negative. Consequently transistor 2451 is made to conduct and its collector drops to a near zero potential, which through diode 2456 and 2457, brings back to their initial state both bi-stable triggers constituted respectively by transistors 2411 and 2412 on the one hand, and 2413 and 2414 on the other hand.

It must be noticed that this positioning is slightly delayed by a time constant circuit, comprising mainly capacitor 2415 in order to make this device insensitive to spurious short-duration signals.

Both bi-stable triggers constituting assembly 241 being simultaneously in their initial state, the collector of transistor 2412 on one hand and the collector of transistor 2414 on the other hand are at a highly negative potential, which results in transistor 2454 being made to conduct. The collector of the latter then assumes a near zero potential which cuts off transistor 2455 and 2458.

Transistor 2455 being cut off, its collector becomes negative, which in turn results in cutting off diodes 2416, 2417, 2418. Cutting-off diode 2416 suppresses the zero potential which keeps transistors 2032, 2033, 2040 in a cut-off state. Transistor 2033 then conducts, due to a negative current coming from amplifier $9_8$ and applied to its base through resistor 2034, diode 2035 and resistor 2036. When conducting, transistor 2033 causes a spacing current to be applied to the transmission channel 28, as described previously in the preceding J paragraph (transmitting device). It is to be noted that transistor 2032 conducts also due to a base current which is produced through resistors 2037 and 2038 since diodes 2039 and 2041 are now cut-off. This transistor has then a function similar to that of transistor 2033 with which it has a common emitter and a common collector. However, transistor 2040 stays cut-off, no base current being applied to it, since the collector of transistor 2222 is at zero potential. The blocking of diode 2417 removes a short circuit which was preventing transistor 1102 from conducting. Due to this fact an incoming marking element on the receiving channel can now initiate the unblocking of this transistor due to a negative current coming from the collector of transistor 1203 and applied to the base of transistor 1102 through resistors 1106 and 1108, which causes oscillator 1 to start oscillating as shown previously.

The blocking of diode 2418 allows capacitor 1917 to charge negatively, from the collector of transistor 1401, through resistor 1930. This change results in keyboard 19 being rendered operative again.

As to transistor 2458, its being cut off allows a base current to flow into transistor 2459 which is then made conducting and short-circuits the left winding of relay $24_2$. The latter is then energized according to the same sequence of operations which has been explained previously when relay $23_2$ was energized. The energization of relay $24_2$ causes motor 26 to start and signal light 27 to be lighted.

In the case where a long duration marking current occurs on the receiving channel, this current initiates the oscillator and 30 milliseconds after its initial start, a positive pulse, obtained by differentiating the rectangular waveform supplied by amplifier $9_1$, is applied to the binary demultiplier consisting mainly of transistors 2411 and 2412. This demultiplier then switches its condition and the collector of transistor 2411 delivers a negative step signal. The marking current continuing on the receiving channel, the oscillator cannot be cut off at the end of the cycle and a second cycle begins immediately. Thirty milliseconds after the start of this new cycle, i.e. 160 milliseconds after the start of the marking current amplifier $9_1$ delivers a new positive step signal which causes the first binary demultiplier to switch again its condition and the collector of transistor 2411 of this demultiplier to deliver in its turn a positive step signal. The latter is applied to the second binary demultiplier consisting mainly of transistor 2413 and 2414. The second demultiplier switches its condition and the collector of transistor 2414 assumes a near zero potential. If the marking current still persists on the receiving channel, a third cycle succeeds immediately to the first two. Thirty milliseconds after the start of this cycle, i.e. 290 milliseconds after the marking current has begun to appear on the receiving channel, a third positive step signal is delivered by amplifier $9_1$, and applied to the first binary demultiplier which switch its condition. The collector of transistor 2412 then assumes a near zero potential. The collectors of transistors 2412 and 2414 being simultaneously at zero potential, transistor 2454 is cut off, which, by a sequence of operations opposite to the one described when transistor 2454 was unblocked, causes:

The de-energization of relay $24_2$ which in turn causes signal light 27 to be turned off and motor 26 to stop;

A marking current to be applied to the transmitting channel through diode 2416;

The time base oscillator to be cut off through diode 2417;

The keyboard to be rendered inoperative through diode 2418.

It is worthwhile to note that the sequence of the preceding operations is wholly and absolutely a function of the uninterrupted presence of a marking current on the receiving channel during a minimum period of 290 milliseconds. Should a single spacing element occur on the receiving channel, both binary demultipliers constituting sub-assembly $24_1$ would instantly resume their initial condition as soon as the spacing element appears which would require a new negative current, lasting 290 milliseconds, on the receiving channel to initiate again the operation of the above-mentioned device.

It is also to be noticed that when the contact "incident paper" $26_6$ is closed, transistor 2451 and consequently diodes 2456 and 2457 are cut off. At the third cycle occurring under those conditions, the device operates as indicated previously causing the termination signal to be sent on the transmitting channel, motor 26 to be stopped and the signal light 27 to be rhythmically lighted. This last function is carried out through relay $23_2$. The blocking keylock mechanism $23_5$ operation prevents eventually an inopportune start of motor 26 by a call occurring on the receiving channel, when the operator carries out a local operation which requires the machine to be stopped (e.g. changing the paper supply). The sequence of operations is identical to the one mentioned previously; a zero potential is applied to the base of transistor 2451 through diode 2340, which results in this transistor being cut off.

The changes of service condition of both channels mentioned heretofore were caused by remote control. They can also be caused locally by bringing into play "Call" button $24_3$ and "Termination" button $24_4$. By depressing button $24_3$ the emitter and the collector of transistor 2033 are connected together, which causes a spacing current to be applied to the transmitting channel. The other terminal of, said channel, upon reception of this signal; will send it back on the receiving channel, which will bring it to a receiving condition as explained previously. On the contrary depressing button $24_4$ results in applying a ground potential to the bases of transistor 2032, 2033, 2040, through respectively diodes 2041, 2043, 2042; this ground potential causes these three transistors to be cut-off and, consequently, a marking current to be applied to the transmitting channel. The other terminal of said channel, upon receiving this signal, will send it back on the receiving channel, bringing about the "Out of operation" condition as shown previously.

What we claim is:

1. An electronic transistor teleprinter apparatus for receiving and transmitting start-stop telegraph signals having $n$ code elements comprising a receiver trigger device connected to the reception lead of a telegraphic line, a keyboard formed by a plurality of keys corresponding to the several characters to be signalled and acting upon $n$ transmission element contacts and a general transmission contact, a transmitter trigger device connected to the transmission lead of said telegraphic line, a time-base constituted by an oscillator, a plurality of cascade-connected binary frequency-dividers adapted to be energized either by said receiver trigger device or by said general transmission contact, a matrix of bus bars connected to said frequency-dividers, a plurality of $n$ gate circuits connected to the bus bars of said time-base and controlled by the receiver trigger device and the general transmission contact, a plurality of $n$ binary storage circuits having their inputs connected respectively both to said $n$ gate circuits and to said $n$ transmission element contacts and their outputs connected both to the transmitter trigger device and to a plurality of $n$ code electromagnets, a correction circuit associated with the time-base and connected between one of the bus bars of the matrix and one of the binary frequency-dividers, reducing the cycle of the time-base from $n+2.5$ element time intervals to $n+1.5$ element time-intervals when the teleprinter apparatus is receiving, and a transmission-reception trigger circuit controlled both by the receiver trigger device and the general transmission contact and controlling said correction circuit.

2. An electronic transistor teleprinter apparatus for receiving and transmitting start-stop telegraph signals having $n$ code elements comprising a receiver trigger device connected to the reception lead of a telegraphic line, a keyboard formed by a plurality of keys corresponding to the several characters to be signalled and acting upon $n$ transmission element contacts and a general transmission contact, a transmitter trigger device connected to the transmission lead of said telegraphic line, a time-base constituted by an oscillator, a plurality of cascade-connected binary frequency-dividers adapted to be energized either by said receiver trigger device or by said general transmission contact, a matrix of bus bars connected to said frequency-dividers, a plurality of $n$ gate circuits connected to the bus bars of said time-base and controlled by the receiver trigger device and the general transmission contact, a plurality of $n$ binary storage circuits including each a first stage and a second stage, the circuits of the first stage having their inputs connected respectively both to said $n$ gate circuits and to said $n$ transmission element contacts and their outputs connected to the inputs of the second stage, the circuits of the second stage having their outputs connected both to the transmitter trigger device and to a plurality of $n$ code electromagnets, a correction circuit associated with the time base and reducing the duration of the cycle of the time-base when the teleprinter apparatus is receiving, a transmission-reception trigger circuit including a first and a second stage respectively associated with the first and second stages of the binary storage circuits, a first reset device associated with the time-base controlled at the same time by said time-base, the first transmission-reception trigger circuit stage and the second transmission-reception trigger circuit stage and controlling the reset of the first binary storage circuit stage and of the first transmission-reception trigger circuit stage and the transfer from said stages respectively to the second binary storage circuit stage and second transmission-reception trigger circuit stage, and a second reset device associated with the time-base and resetting to a rest position the second binary storage circuit stage and the second transmission-reception trigger circuit stage, and controlled by the time-base.

3. An electronic transistor teleprinter apparatus for receiving and transmitting start-stop telegraph signals having $n$ code elements comprising a receiver trigger device connected to the reception lead of a telegraphic line, a keyboard formed by a plurality of keys corresponding to the several characters to be signalled and acting upon $n$ transmission element contacts and a general transmission contact, a transmitter trigger device connected to the transmission lead of said telegraphic line, a time-base adapted to be initiated by said receiver trigger and by said general transmission contact, including a pluse generator, a plurality of binary frequency-dividers for said pulse generator and a matrix of terminals connected to said frequency-dividers, a plurality of $n$ gate circuits connected to said terminals of said time-base and controlled by the receiver trigger device and the general transmission contact, a plurality of $n$ binary storage circuits including each a first stage and a second stage, the circuits of the first stage having their inputs connected respectively both to said $n$ gate circuits and to said $n$ transmission element contacts and their outputs connected to the inputs of the second stage, the circuits of the second stage having their outputs connected both to the transmitter trigger device and to a plurality of $n$ code electromagnets, correcting circuit means connected between one terminal of said matrix and one of said frequency-dividers associated with the time-base reducing the cycle of the time-base by an amount which is equal to the difference of $n+2.5$ element time intervals and $n+1.5$ element time-intervals when the teleprinter apparatus is receiving, and a transmission reception trigger circuit controlled both by the receiver trigger device and the general transmission contact and controlling said correction circuit means.

4. An electronic transistor teleprinter apparatus as recited in claim 3 wherein said transmission-reception trigger circuit includes a first and a second stage respectively associated with the first and second stages of the binary storage circuits, a first reset means controlled by the time-base to reset the first binary storage circuit stage and the transfer to the second binary storage circuit stage and second transmission-reception trigger circuit stage, and a second reset means controlled by the time-base for resetting to a rest position the second binary storage circuit stage and second trigger circuit stage.

No references cited.